April 1, 1924.
R. O. RICE
1,489,222
TOOL SUPPORT FOR GEAR CUTTERS
Filed July 28, 1921   2 Sheets-Sheet 1
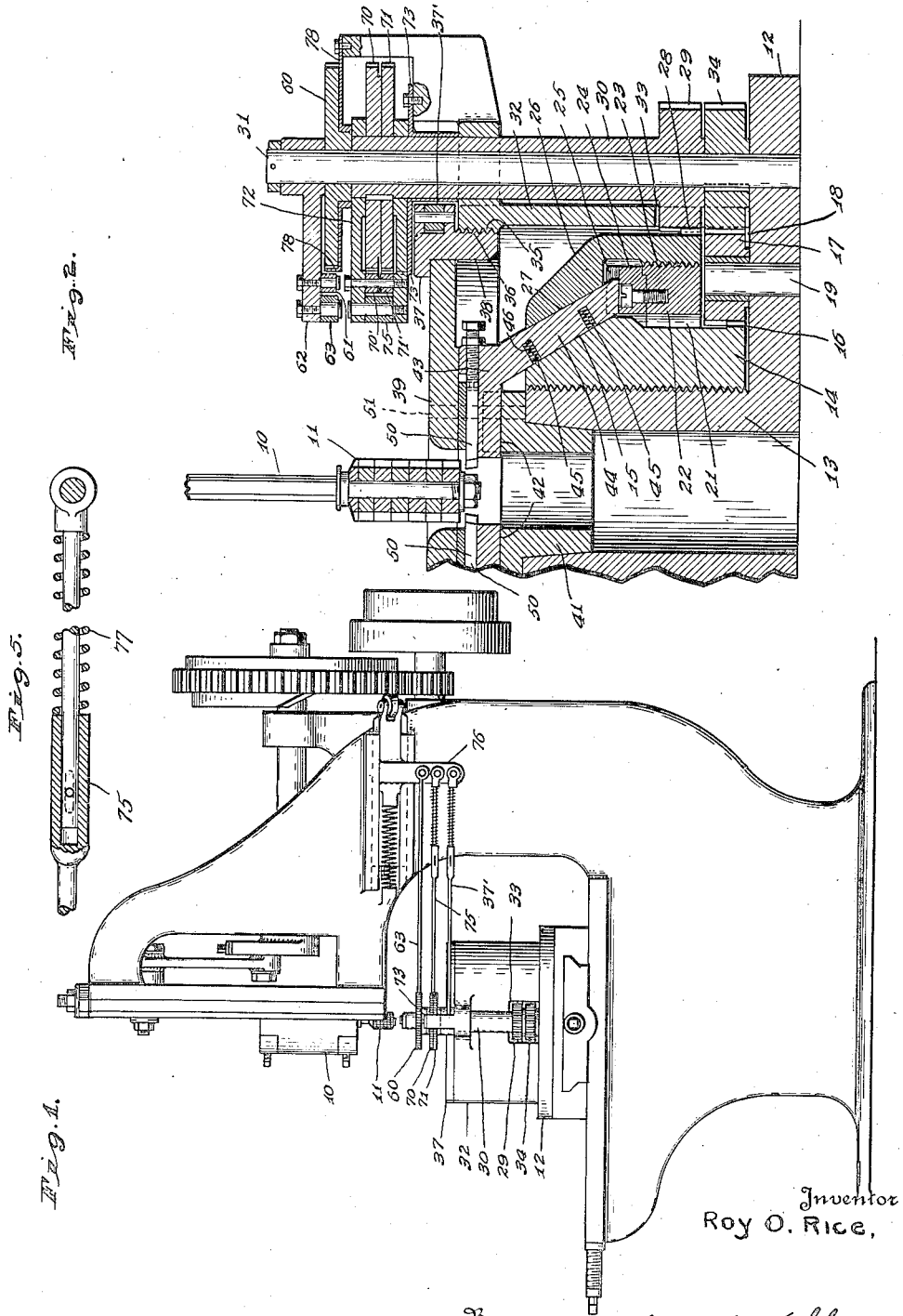
Inventor
Roy O. Rice,
By Hood & Schley
Attorneys April 1, 1924.
R. O. RICE
1,489,222
TOOL SUPPORT FOR GEAR CUTTERS
Filed July 28, 1921        2 Sheets-Sheet 2
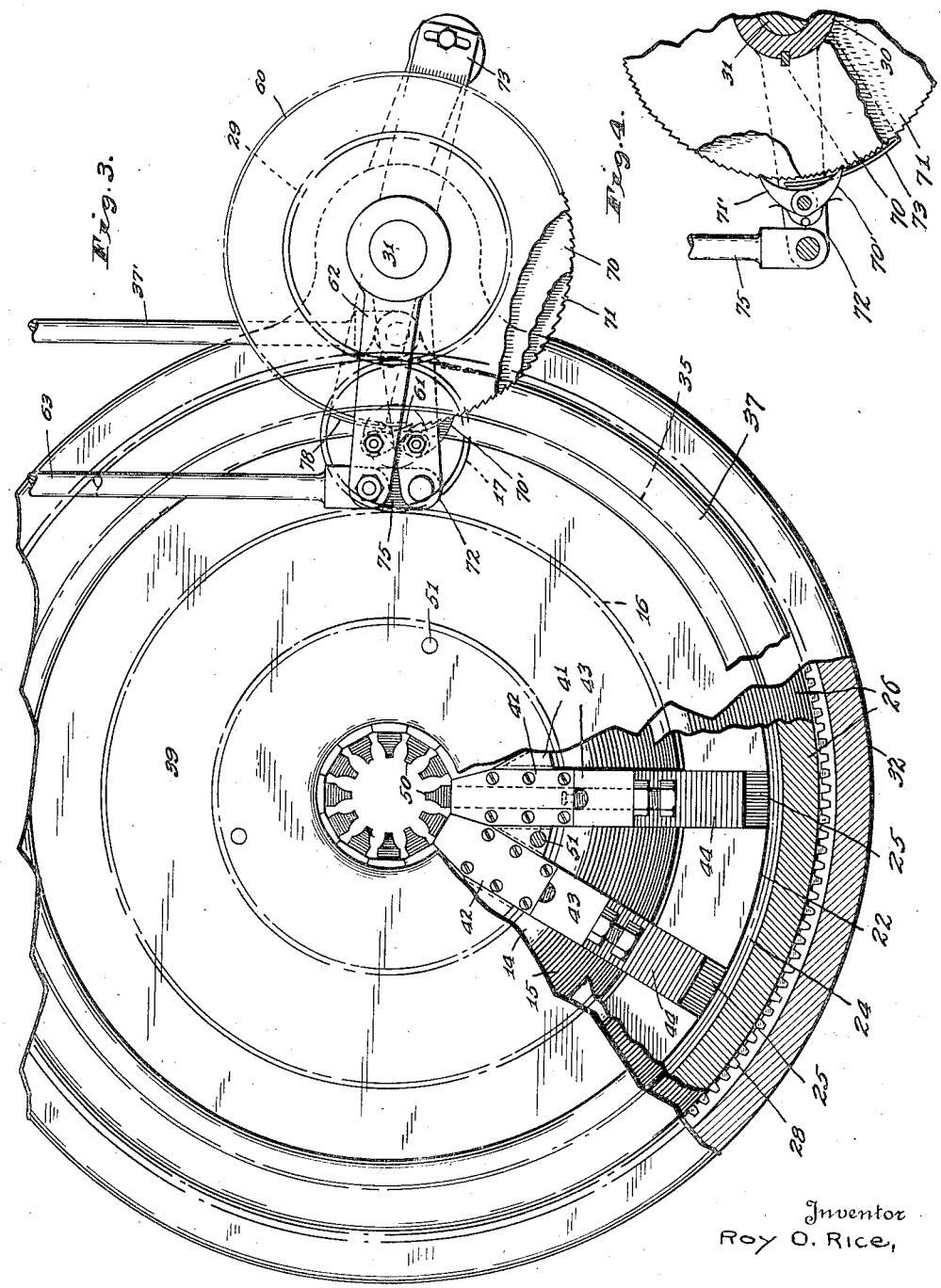
Inventor
Roy O. Rice,
By Hood & Schley
Attorneys Patented Apr. 1, 1924.

1,489,222

UNITED STATES PATENT OFFICE.

ROY O. RICE, OF INDIANAPOLIS, INDIANA, ASSIGNOR TO STEVENSON GEAR COMPANY, OF INDIANAPOLIS, INDIANA, A CORPORATION OF DELAWARE.

TOOL SUPPORT FOR GEAR CUTTERS.

Application filed July 28, 1921. Serial No. 488,061.

*To all whom it may concern:*

Be it known that I, ROY O. RICE, a citizen of the United States, residing at Indianapolis, in the county of Marion and State of Indiana, have invented a new and useful Tool Support for Gear Cutters, of which the following is a specification.

My invention relates to that type of machine designed for forming gears and other polygonal articles, in which the circumferential series of cutting or forming tools are arranged to act simultaneously upon the blank.

The object of my invention is to provide means by which the several cutting tools may be simultaneously adjusted and supported, the construction being such that the tools are free for adjusting movements and firmly clamped just prior to, and during, the cutting operation.

The accompanying drawings illustrate my invention. Fig. 1 is an elevation of the machine embodying my improvements; Fig. 2, an axial section, on an enlarged scale, of my improvements; Fig. 3, a plan of the parts shown in Fig. 2; Fig. 4, a fragmentary plan of the parts shown in Figs. 2 and 3, and Fig. 5, a detail of rod 75.

In the drawings, 10 indicates a vertically reciprocable plunger or mandrel carrying blanks 11 which are to be operated upon. This plunger 10 is to be reciprocated by any suitable means common and well known and, therefore not illustrated or described in detail herein.

Co-axial with plunger 10 is an annular base or support 12 provided with a cylindrical central portion 13 which is co-axial with plunger 10. Threaded upon cylinder 13 is a ring 14 provided with a conical tool-clamping surface 15 and also provided with a circumferential series of gear teeth 16 which mesh with a pinion 17 which is journaled in the pocket 18, in base 12, upon pin 19.

Ring 14 lies in an annular pocket 21 formed in base 12 between cylinder 13 and a shorter annulus 22, which annulus is externally threaded as indicated at 23. The upper end of annulus 22 carries a hardened ring 24 in which are formed a series of angularly spaced radial notches 25, the purpose of which will appear.

Threaded upon the threads 23 is a clamping ring 26 which is provided with an internal conical tool-clamping face 27 having the same pitch as, and therefore parallel with, the cone 15. Ring 26 is provided externally with a circumferential series of gear teeth 28 which mesh with the pinion 29 carried by sleeve 30 and journaled on shaft 31, journaled at its lower end in base 12.

Integral with, or secured to, base 12, is a ring 32 which is perforated at 33 to permit the projection of pinions 29 and 34 therethrough. Pinion 34 is keyed to shaft 31 and meshes with pinion 17. Ring 32 is internally threaded at 35 and these threads receive external threads 36 carried by ring 37, which is provided with an internally projected flange 38 engaging the outer circumference of a tool clamping ring 39. Ring 37 is oscillated by a spring link 37' from bar 76.

The upper end of cylinder 13 carries a tool-seat ring 41 which is provided with a plurality of circumferentially spaced radial tool-seats 42, corresponding in number and arrangement with the grooves 25. Seated in each groove 25 is the tool carrier 43 provided with a downwardly and outwardly projecting tail 44 adapted to lie, and be clamped between the cones 15 and 27, the lower end of said tail fitting laterally in groove 25 and resting upon the bottom of said groove. Each tail carries one or more springs 45 in pockets 46 and engages cone 15. It is obvious that the tools themselves may be shaped in a manner similar to the tool carriers if so desired.

The forming tools 50 may be either integral with holder 43 or separate therefrom, as shown in Fig. 2. The holders 43 lie between rings 41 and 39 and ring 39 is held against turning by means of one or more pins 51 extended from ring 39 to ring 41.

In order to manipulate the tool-clamping and positioning parts 14, 26 and 39, automatically, I have provided the following mechanism:—

Ring 14 needs to be gradually lowered on the cylinder 13, and for this purpose shaft 31 is provided with a ratchet wheel 60 engaged by pawls 61 and carried by an arm 62, reciprocated by a link 63, connected to any suitable moving part of the apparatus so as to be synchronized with the movement of plunger 10. Sleeve 30 carries two oppositely arranged ratchet wheels 70 and 71. Journaled on sleeve 30 is a pawl-carrying arm 72 which carries two pawls, 70' and 71', adapted to engage respectively the ratchet wheels 70 and 71.

In order that the forward (downward) movement of cone 27 may be variable, I provide a guard 73, of common form, to co-act with pawl 71' so that, although the stroke of arm 72 is a constant one, the effectiveness of pawl 71' upon the ratchet wheel 70, may be variable in the well known manner.

Arm 72 is reciprocated, through the medium of connecting rod 75, by any suitable reciprocating member 76 synchronized with the plunger 10, and in order to compensate the differences in possible movements, I at the same time operate arm 62 by the same member 76.

Link 75 is a two part structure, as shown in Fig. 5, with an intermediate compression spring 77.

The effectiveness of pawl 61 upon ratchet wheel 60 is regulated by a guard 78.

The operation is as follows:—

Cone 15 is vertically adjusted until it will establish that radial position of tools 50 which will produce the desired initial cut in the blank 11, this being preferably done by throwing out pawl 61 and manually manipulating ratchet wheel 60; cone 27 is then screwed down tightly upon tails 44 by throwing out pawl 70' and manually manipulating ratchet wheel 70; and ring 37 is screwed down so as to firmly clamp ring 39 upon the various tool holders by manually manipulating ratchet wheel 71. Thereupon, plunger 10 is moved downwardly so as to cause the first cut. At the completion of this cutting stroke backward reciprocation of member 76 operates to pull upon link 63, so as to act on pawl 70' and ratchet wheel 70, sleeve 30, pinion 29, and teeth 28 to turn ring 26 so as to move it upward on threads 23, thereby retracting cone 27 from tails 44 and thereby permitting springs 45 to move the tools 50 radially outwardly enough to provide proper clearance. At about the same time, pawl 61, acting upon ratchet wheel 60, turns shaft 31, pinions 34 and 17 and ring 14 so as to screw said ring 14 downwardly on part 13, the amount of this downward movement of cone 15 determining the depth of the next cut. At the same time that cone 27 is retracted from tails 44, ring 37 is oscillated so as to screw upwardly in threads 35 to release the clamping ring 39 so that the tool holders 43 may be readily shifted radially in their seats 42.

After cone 15 has been set to determine the depth of the next cut, element 76, exerting a push upon link 63 through the compression of spring 77, acts through pawl 71' ratchet wheel 70, sleeve 30 and gear 29, to screw cone 27 down upon the tails 44 until they are firmly clamped upon cone 15, thus shifting the tool holders radially inwardly to the proper position for the next cut. As soon as this movement has been accomplished, ring 37 is screwed down upon the clamping ring 39 so as to firmly clamp the tool holders in the new position.

The above cycle of operations is repeated until the desired depth of cut has been obtained.

I claim as my invention:

1. In an apparatus of the class described, the combination of a circumferentially spaced series of forming tool carriers, each having an inclined tail, a series of seats for said tools, a pair of cones having co-related faces between which the tails of the tools may be clamped, and means for shifting said cones axially to shift said tools in their seats.

2. In an apparatus of the class described, the combination of a circumferentially spaced series of forming tool carriers, each having an inclined tail, a series of seats for said tools, a clamping ring for clamping said tools in their seats, a pair of cones having co-related faces between which the tails of the tools may be clamped, and means for shifting said cones axially to shift said tools in their seats.

3. In an apparatus of the class described, the combination of a circumferentially spaced series of forming tool carriers, each having an inclined tail, a series of seats for said tools, a clamping ring for clamping said tools in their seats, a pair of cones having co-related faces between which the tails of the tools may be clamped, and means for shifting said cones axially, said means comprising elements for alternately shifting one of the cones in opposite directions, the movements in one direction being greater than the movements in the opposite direction.

4. In an apparatus of the class described, the combination of a circumferentially spaced series of forming tool carriers, each having an inclined tail, a series of seats for said tools, a cone bearing for the tails of said tools and means for shifting said cone bearing axially to shift the tools in their seats.

5. In an apparatus of the class described, the combination of a circumferentially spaced series of forming tool carriers each having an inclined tail, a series of seats for said tools, means for clamping said tools in their seats, a cone bearing for said tails and means for shifting said bearing axially to shift the tools in their seats.

6. In an apparatus of the class described, a combination of a circumferentially spaced series of forming tool carriers each having an inclined tail, a clamping ring for clamping said tools in their seats, a pair of cones having co-related faces between which the tails of the tools may be clamped, means for intermittently alternately operating said clamping means to clamp and release the tools in their seats and means for alternately and intermittently first moving said cones axially relatively and then moving one of said cones axially in the same direction the other one had previously been moved.

In witness whereof, I Roy O. Rice, have hereunto set my hand at Indianapolis, Indiana, this 16th day of July, A. D. one thousand nine hundred and twenty-one.

ROY O. RICE.